United States Patent
Eser et al.

(10) Patent No.: US 11,264,656 B2
(45) Date of Patent: Mar. 1, 2022

(54) CONTROL MODULE FOR THE TEMPERATURE CONTROL OF A BATTERY

(71) Applicant: Vitesco Technologies Germany GMBH, Hannover (DE)

(72) Inventors: Gerhard Eser, Hemau (DE); Stefan Klöckner, Kelkheim (DE); Silviu Soptica, Giroc (RO); Christof Schmidt, Regensburg (DE)

(73) Assignee: Vitesco Technologies GmbH, Regensburg (DE)

(*) Notice: Subject to any disclaimer, the term of this patent is extended or adjusted under 35 U.S.C. 154(b) by 38 days.

(21) Appl. No.: 16/815,375

(22) Filed: Mar. 11, 2020

(65) Prior Publication Data

US 2020/0259228 A1    Aug. 13, 2020

Related U.S. Application Data

(63) Continuation of application No. PCT/EP2018/073949, filed on Sep. 6, 2018.

(30) Foreign Application Priority Data

Sep. 11, 2017 (DE) ............ 10 2017 215 984.7

(51) Int. Cl.
| | |
|---|---|
| *H01M 10/63* | (2014.01) |
| *H01M 10/613* | (2014.01) |
| *H01M 10/6568* | (2014.01) |
| *H01M 10/625* | (2014.01) |
| *H01M 10/48* | (2006.01) |

(52) U.S. Cl.
CPC ......... *H01M 10/63* (2015.04); *H01M 10/486* (2013.01); *H01M 10/613* (2015.04); *H01M 10/625* (2015.04); *H01M 10/6568* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 8,215,432 B2 | 7/2012 | Nemesh et al. | |
| 2011/0091750 A1* | 4/2011 | Claypole | H01M 10/613 429/50 |
| 2014/0374081 A1* | 12/2014 | Kakehashi | B60H 1/04 165/202 |

(Continued)

FOREIGN PATENT DOCUMENTS

| | | |
|---|---|---|
| CN | 105811043 A | 7/2016 |
| CN | 206358015 U | 7/2017 |

(Continued)

OTHER PUBLICATIONS

Schaeffler AG; Thermomanagement-Modul; http://m.schaeffler.de/content.mobile.products/de/products/automotive/engine/tmm/tmm_info.html.

(Continued)

*Primary Examiner* — Lisa S Park

(57) ABSTRACT

In order to realize temperature control of a battery in a simplified manner, a control module having a coolant control valve, a coolant temperature sensor and a coolant pump is provided. The coolant control valve, the coolant temperature sensor and the coolant pump are integrally assembled to form the control module.

9 Claims, 2 Drawing Sheets

(56) References Cited

U.S. PATENT DOCUMENTS

| | | | | |
|---|---|---|---|---|
| 2015/0101789 A1* | 4/2015 | Enomoto | ................ | B60L 50/16 165/202 |
| 2017/0088006 A1 | 3/2017 | Blatchley et al. | | |
| 2017/0110770 A1 | 4/2017 | Marcicki et al. | | |
| 2018/0006347 A1* | 1/2018 | Porras | ................ | H01M 10/633 |

FOREIGN PATENT DOCUMENTS

| | | |
|---|---|---|
| DE | 102009023863 A1 | 12/2009 |
| DE | 102010034484 A1 | 2/2012 |
| DE | 102014113753 A1 | 3/2016 |
| DE | 102014225212 A1 | 6/2016 |
| DE | 102016102116 A1 | 8/2016 |
| DE | 102015119098 A1 | 5/2017 |
| DE | 102017200874 A1 | 5/2018 |
| WO | 2017076644 | 5/2017 |

OTHER PUBLICATIONS

International Search Report and Written Opinion dated Dec. 13, 2018 from corresponding International Patent Application No. PCT/EP2018/073949.
German Office Action dated Jun. 13, 2018 for corresponding German Patent Application No. 10 2017 215 984.7.

* cited by examiner

CONTROL MODULE FOR THE TEMPERATURE CONTROL OF A BATTERY

CROSS-REFERENCE TO RELATED APPLICATIONS

This application claims the benefit of PCT Application PCT/EP2018/073949, filed Sep. 6, 2018, which claims priority to German Application DE 10 2017 215 984.7, filed Sep. 11, 2017. The disclosures of the above applications are incorporated herein by reference.

TECHNICAL FIELD

The disclosure relates to a control module for temperature control of a battery which serves, for example, for driving a motor vehicle. Moreover, the disclosure relates to a cooling arrangement for a motor vehicle.

BACKGROUND

A battery, for example a lithium-ion battery, of an electric vehicle or of a hybrid vehicle must, for service life, capacity and performance reasons, be operated within a defined temperature window. Furthermore, the heat which arises in the battery during charging and uncharging has to be reliably dissipated.

This function has been performed hitherto by separate pumps and valves and an associated sensor system. In some examples, a temperature-measuring sensor system is used in order to control or regulate the temperature of the battery under open-loop or closed-loop control.

Temperature control of a battery has generally occurred hitherto by so-called temperature management. Such temperature management is usually carried out by individual pumps, valves and sensors. These components have to be connected to or clamped onto the battery in the desired manner.

DE 10 2015 119 098 A1 describes a control arrangement for a mechanically controllable coolant pump of an internal combustion engine. The control arrangement has an adjustable control slide, by means of which a throughflow cross section of an annular gap between an outlet of a coolant pump impeller and a surrounding delivery duct can be controlled, a control pump, by means of which a hydraulic pressure can be generated in a flow duct, a first pressure space of the control slide, which is formed on a first axial side of the control slide, and an electromagnetic valve having two valve seats and three flow connections and also a closing member which is connected to an armature of the electromagnetic valve and is axially movable. The first flow connection is fluidically connected to an outlet of the control pump, and the second flow connection is fluidically connected to a first pressure space of the control slide. In order to achieve control as quickly as possible, the third flow connection is fluidically connected to an inlet of the coolant pump, with the first valve seat being formed between the first flow connection and the second flow connection, and the second valve seat being formed between the second flow connection and the third flow connection.

Furthermore, document DE 10 2014 225 212 A1 describes a temperature control system for batteries. The temperature control system for a battery, in particular for a vehicle battery, includes at least one fluid system having at least one fluid duct and includes at least one control element for throughflow control, the element being arranged in the fluid system. The control element can be brought at least into an open position and at least into a closed position at least in dependence on a battery temperature and/or an ambient temperature, with the result that the fluid system can be opened or closed.

Furthermore, document DE 10 2014 113 753 A1 discloses a system and method for predictive open-loop and/or closed-loop control of a heating/cooling device of a vehicle. In particular, a thermal control system for predictive open-loop and/or closed-loop control of a heating/cooling device for air-conditioning of a vehicle interior is presented.

In addition, so-called thermal management modules or rotary slide systems which drive a valve system via a rigid shaft in the main cooling circuit are known. Such a thermal management module is described in http://m.schaeffler.de/content.mobile.products/de/products/automotive/engine/tmm/tmm_info.html.

SUMMARY

The disclosure provides thermal management of a battery with simple means.

One aspect of the disclosure provides a control module for temperature control of a battery. Such a control module controls or regulates coolant such as a coolant circuit under open-loop or closed-loop control. The coolant cools or heats the battery. The battery may be a traction battery, for example a lithium-ion battery for an electric vehicle or a hybrid vehicle.

The control module has a coolant control valve, a coolant temperature sensor and a coolant pump. The coolant control valve controls a coolant flow in terms of its direction and/or flow rate. The coolant temperature sensor allows the temperature of the coolant to be measured. The coolant pump drives the coolant flow in dependence on an activation signal.

Implementations of the disclosure may include one or more of the following optional features. In some implementations, the coolant control valve, the coolant temperature sensor and the coolant pump are assembled as an independent subassembly or as an independent component, where appropriate integrally, to form the control module. This results in a compact module which physically forms a unit and may be assembled as a unit with other devices, for example a battery. The control module is an inherently functional unit, with the coolant control valve, the coolant temperature sensor and the coolant pump being fixedly connected to one another operatively, and in some examples, also fluidically. It is thus not necessary for these three components still to be connected to one another for example by hoses and the like. Rather, the control module is an intrinsically compact and fully functional multifunctional component. Accordingly, a compact control module for thermal management, for example, of a traction battery can thus be provided.

In some implementations, the coolant control valve has a first coolant inlet for connection to a first coolant circuit, a second coolant inlet for connection to a second coolant circuit, and a coolant outlet, and the coolant outlet of the coolant control valve is directly connected to the coolant pump via a coolant path. The control module thus has at least two inlets into which coolant can flow and at least one coolant outlet from which the coolant can flow out of the control module. Of course, the flow direction may also be reversed, with the result that the aforementioned coolant outlet forms a coolant inlet and the aforementioned coolant inlets each form coolant outlets. In general, it also holds hereinbelow that the flow direction in each coolant path or coolant circuit can be reversed as desired.

In some implementations, the control module has a single common electrical interface for power supply and/or communication. The control module thus has for example a plug socket with one or more contacts to ensure the power supply and/or the communication of the control module. Where appropriate, the electrical interface has one or more contacts to supply the coolant control valve, the coolant temperature sensor and/or the coolant pump with power from outside. Moreover, the control or data signals may be intended to be exchanged with the control module. For this purpose, the electrical interface may have corresponding data contacts or control contacts.

Moreover, the coolant temperature sensor may be integrated in a housing of the coolant control valve or of the coolant pump. A dedicated housing is not provided for the coolant temperature sensor in this case, or at least the housing of the coolant temperature sensor is formed in one piece with the housing of the coolant control valve or of the coolant pump. All three components of the control module may have a common, one-piece housing.

Another aspect of the disclosure provides a heating element mounted in or on the coolant control valve or the coolant pump. The heating element is here situated in or on the coolant path of the coolant control valve or the coolant pump so as correspondingly to be able to release heat energy to the coolant in the coolant path. The heating element provides the control module with the additional function of also being able to heat the battery. Specifically, a coolant flow flowing in the battery may thus be heated in a desired manner. The heating element may be a PTC (positive temperature coefficient) heating element.

In some implementations, the control module has a control device that autonomously controls or regulates the control module under open-loop or closed-loop control. This control device controls the coolant control valve and/or the coolant pump, where appropriate as a function of a signal from the coolant temperature sensor. It is thus sufficient if, for example, the control module is activated from outside with simple control signals such as "on" or "off". The further, more complex control is then taken over by the control module by the control device itself. Where appropriate, the control device also makes it possible to carry out regulation under closed-loop control if, for example, the control module has the aforementioned heating element.

In some implementations, in a first switching state of the coolant control valve, only the first coolant inlet forms an inlet for coolant to the control module, and, in a second switching state, only the second coolant inlet forms the inlet for coolant to the control module. The coolant control valve is thus able to switch over the inlet from a first coolant inlet to a second coolant inlet, and vice versa. In the first switching state, only the first coolant inlet is then flow-connected to the coolant outlet, and, in the second switching state, only the second coolant inlet is flow-connected to the coolant outlet. Alternatively, the coolant control valve can also be configured as a mixing valve.

Furthermore, a cooling arrangement for a motor vehicle having the aforementioned control module is provided. The cooling arrangement has a battery which is connected on the inlet side to a coolant outlet of the coolant pump. This means that the coolant inlet of the battery is directly connected to the coolant outlet of the coolant pump. Moreover, the cooling arrangement has a first coolant circuit, of which a part runs from a first coolant outlet of the battery through a heat exchanger to the first coolant inlet of the coolant control valve. This first coolant circuit may be a cooling circuit which is provided separately for the cooling of the battery. A heat exchanger is integrated in this first coolant circuit and can release the heat absorbed by the battery. In some examples, the cooling arrangement has a second coolant circuit which is separated from the first and in which the heat exchanger is also integrated. Heat can thus pass from the first coolant circuit into the second coolant circuit via the heat exchanger. This second coolant circuit can be, for example, a coolant circuit for cooling a passenger compartment of the motor vehicle.

Furthermore, the cooling arrangement has a third coolant circuit, of which a part runs from a second coolant outlet of the battery to the second coolant inlet of the coolant control valve, in order to control the temperature of the battery. Where appropriate, a battery cooler is installed in the third coolant circuit to cool the battery. However, it is also possible under certain circumstances for the third coolant circuit to be used to warm or to heat the battery. The control module allows the three coolant circuits to be combined with one another in a simple manner to achieve expedient cooling of the battery.

In some examples of the cooling arrangement having the control module, the coolant control valve is switched into the second switching state below a predetermined temperature and into the first switching state above the predetermined temperature. This means that the coolant control valve for example directs only the third coolant circuit through the battery but not the first coolant circuit if the temperature of the battery is still relatively low. However, if the temperature of the battery exceeds the predetermined temperature value, the coolant control valve switches into the first switching state in which the coolant is sent exclusively from the first coolant circuit through the battery. In this first switching state, the battery is for example cooled more effectively by the first coolant circuit.

In some examples of the cooling arrangement, the first cooling circuit runs through at least one drive component for the motor vehicle. For example, the first cooling circuit runs through the electric motor and/or the electronics (for example converter or charging device) for the electric motor or the battery. In other words, the first coolant circuit is guided through at least one component of the drive train. It is possible in this way to save on a separate cooling circuit for the battery.

The advantages and developments stated above in connection with the control module can also be used in the cooling arrangement. The corresponding advantages are thus obtained here, too.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
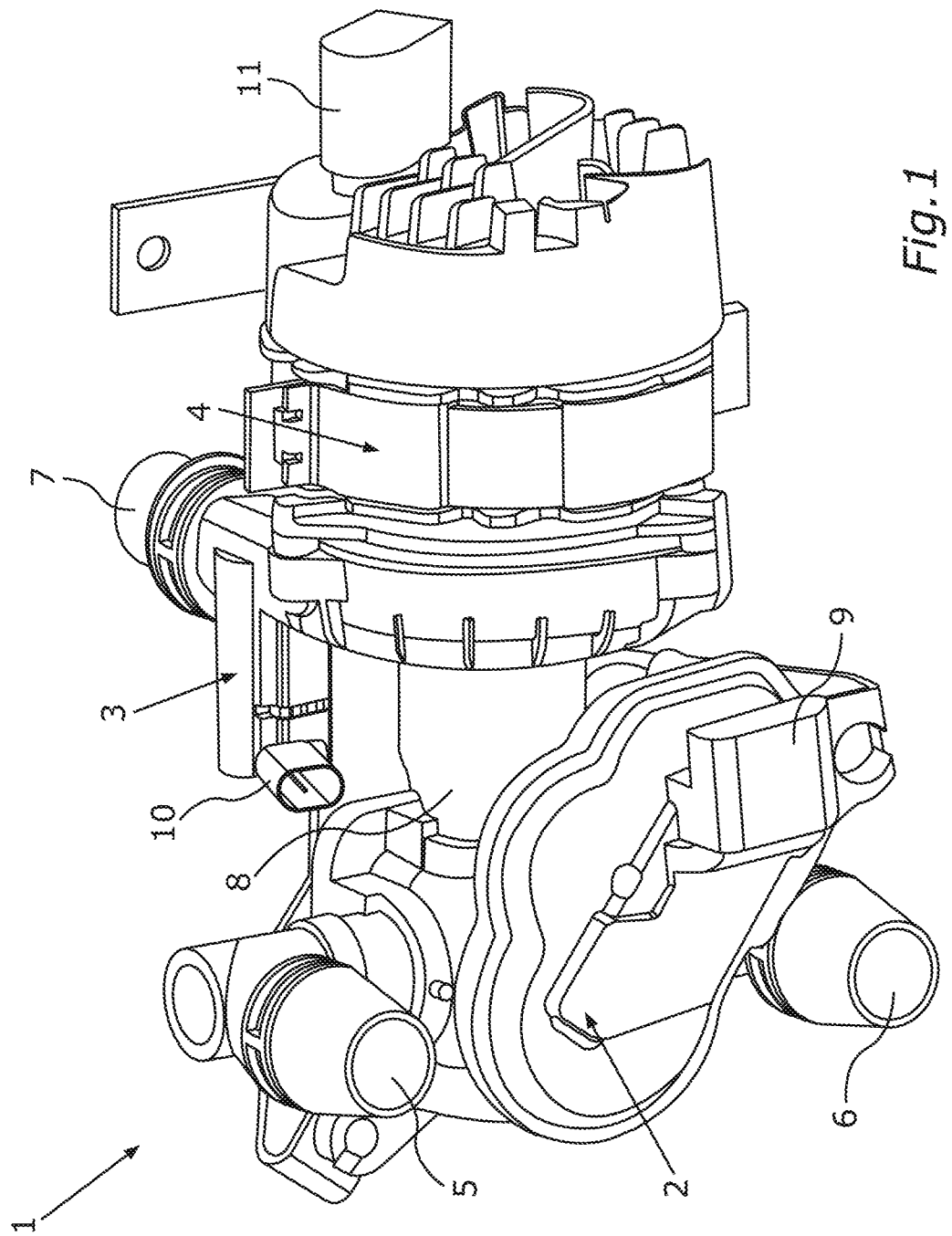
FIG. 1 shows a perspective view of a control module for the temperature control of a battery.

FIG. 1 shows an example of a control module for temperature control of a battery (not shown). In some examples, the battery is a traction battery of a motor vehicle, such as a lithium-ion battery.

The control module 1 illustrated in FIG. 1 shows an independent subassembly and has a coolant control valve 2, a coolant temperature sensor 3 and a coolant pump 4. These three components 2, 3 and 4 are fixedly connected to form an independent unit and form a module, namely the control module 1. The control module 1 has a first coolant inlet 5, a second coolant inlet 6 and a coolant outlet 7 for coolant flows. Coolant flows from the coolant inlet 5 or 6 to the coolant outlet 7 are thus implied. As has already been indicated above, the coolant flows can also be reversed in their direction. This means, for the example of FIG. 1, that the coolant interface designated as coolant outlet would then be a coolant inlet, and the two coolant interfaces designated as coolant inlets 5 and 6 would then be coolant outlets. In the text which follows, however, the interfaces are designated as coolant inlets 5 and 6 or coolant outlet 7 independently of the flow direction.

The coolant pump 4 has a coolant inlet 8 which is flow-connected or fluidically connected to the coolant inlets 5 and 6 via the coolant control valve 2. Here, either only the coolant inlet 5 of the control module 1 can be flow-connected to the coolant inlet 8 of the coolant pump 4, or only the coolant inlet 6 of the control module 1 can be flow-connected to the coolant inlet 8 of the coolant pump 4. Alternatively, the coolant control valve 2 can also be a mixing valve, with the result that both coolant inlets 5 and 6 can also be in through-connection with the coolant inlet 8 of the coolant pump 4. The coolant temperature sensor 3 can be arranged at the coolant inlet 8 or at the coolant outlet 7 of the control module 3. The coolant temperature sensor 3 delivers corresponding temperature signals pertaining to the temperature values of the coolant at the respective location.

The individual components of the control module 1, namely the coolant control valve 2, the coolant temperature sensor 3 and the coolant pump 4 can be accommodated together in a one-piece housing, resulting in an independent module having a plurality of integrated functions. Alternatively, each of the components 2, 3 and 4 can also have an individual housing on their own or as a group. In this case, the individual housings are fixedly connected to one another to form the control module 1.

The coolant control valve 2 can have an electrical valve interface 9, the coolant temperature sensor 3 can have an electrical sensor interface 10, and the coolant pump 4 can have an electrical pump interface 11. The individual components can be controlled or supplied with power via these interfaces 9, 10 and 11. However, it is also possible, where appropriate, for data or measurement signals to be input and output via the electrical interfaces. In some examples, all the interfaces 9, 10 and 11 are combined to form an individual common electrical interface.

The coolant pump 4 may be an electric water pump. Independently thereof, the coolant temperature sensor 3 may be configured as a low-temperature sensor which can only measure temperatures below 150 degrees Celsius (by contrast with high-temperature sensors for exhaust gases operating up to 1000 degrees Celsius). Again independently thereof, the coolant control valve 2 may be a so-called CFCV (coolant flow control valve).

The combination of the coolant control valve 2, the coolant temperature sensor 3 and the coolant pump 4 to form a control module for temperature control of a battery has the advantage that the hosing between the pump and control valve can be dispensed with. Moreover, the temperature sensor can also be favorably integrated in the control module.

Figure 2:
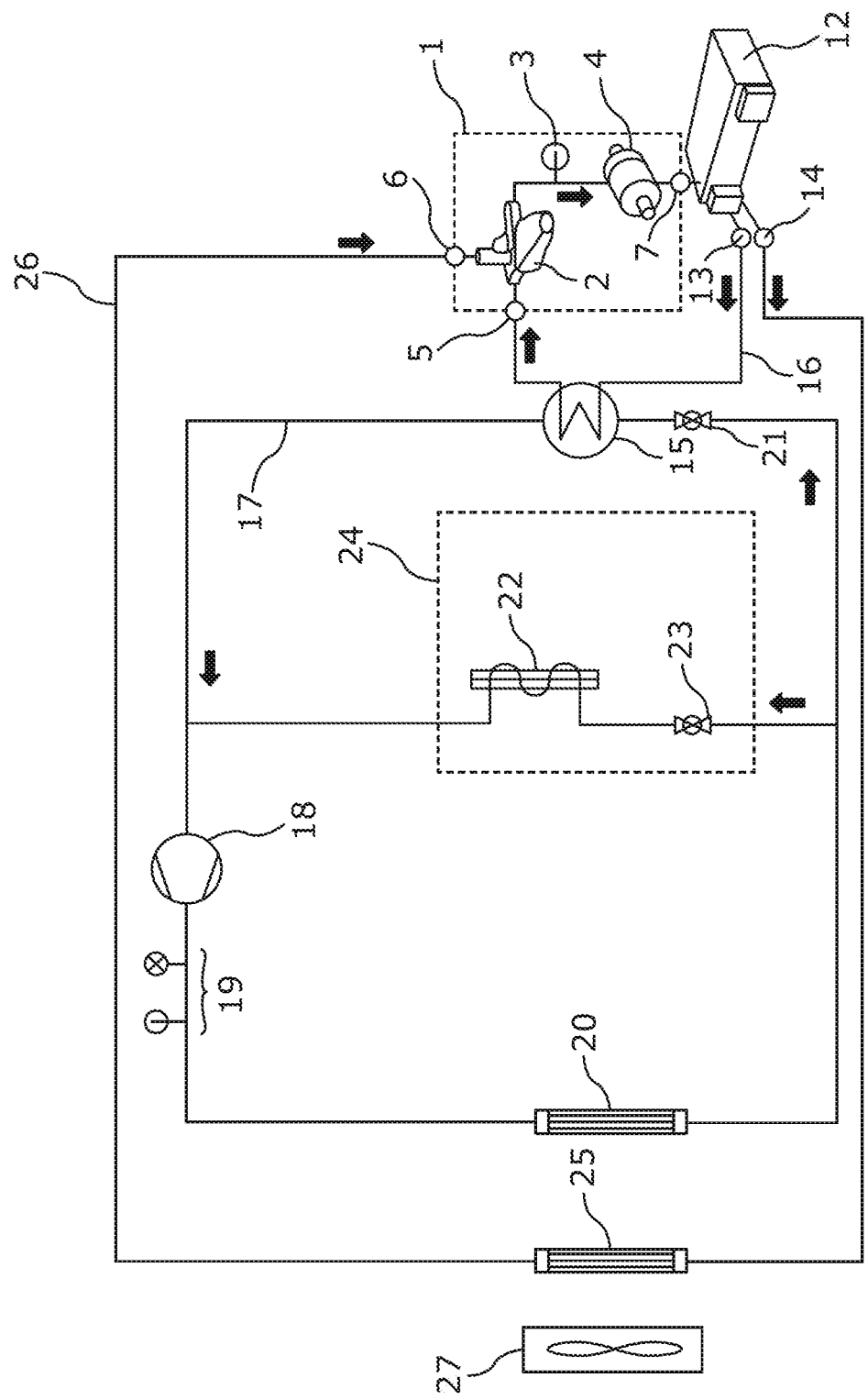
FIG. 2 shows a schematic cooling arrangement having a plurality of coolant circuits in which the control module is integrated.

FIG. 2 shows a cooling arrangement in which a control module 1 is integrated. The control module 1 contains, integrated therein, the coolant control valve 2, the coolant temperature sensor 3 and the coolant pump 4. The first coolant inlet 5 and the second coolant inlet 6 are situated on the coolant control valve 2. Downstream of the coolant control valve there is situated the coolant temperature sensor 3 integrated in the control module, further downstream the coolant pump 4 and further downstream, at the outlet of the control module 1, the coolant outlet 7.

The coolant outlet 7 of the control module 1 is flow-connected to a coolant inlet of a battery, for example, an HV battery (such as a lithium-ion battery) 12. In the present example, the battery 12 has a first coolant outlet 13 and a second coolant outlet 14. The two coolant outlets 13, 14 may be situated on the front panel of the battery 12.

In the example of FIG. 2, the first coolant outlet 13 of the battery 12 is connected to the first coolant inlet 5 of the coolant control valve 2 via a heat exchanger 15. There thus results a first coolant circuit 16 which may run in the flow direction as follows: first coolant inlet 5 of the coolant control valve 2, coolant temperature sensor 3, coolant pump 4, coolant outlet 7 of the control module 1, battery, first coolant outlet 13 of the battery, and heat exchanger 15 back to the first coolant inlet 5.

The heat exchanger 15 is connected separately from the first coolant circuit 16 to a second coolant circuit 17, with the result that no direct, but an indirect heat transfer from the first coolant circuit 16 to the second coolant circuit 17 is made possible. The heat exchanger 15 may be a plate-type heat exchanger. The heat exchanger 15 is connected to a compressor 18. Downstream of the latter there is situated here, where appropriate, a sensor system 19 for controlling or regulating the second coolant circuit or the entire cooling arrangement under open-loop or closed-loop control. Again downstream there is situated, in the present example, an air-conditioning system condenser 20 to which an expansion valve 21 is connected on the other side. The latter is in turn connected to the heat exchanger 15. Parallel to the heat exchanger 15 in series with the expansion valve 21, an air-conditioning system evaporator 22 can be situated in series with an expansion valve 23. For the purpose of cooling a passenger compartment of a motor vehicle, the air-conditioning system evaporator 22 and, where appropriate, also the expansion valve 23 can be situated in the passenger compartment 24. The second coolant circuit 17 may be routed in the flow direction as follows: heat exchanger 15, compressor 18, sensor system 19, air-conditioning system condenser 20 and expansion valve 21 back to the heat exchanger 15. A parallel branch of the second coolant circuit 17 runs from the air-conditioning system condenser 20 via the expansion valve 23 and the air-conditioning system evaporator 22 to the compressor 18. The air-conditioning system evaporator 22 is optionally equipped with a fan 27.

The second coolant outlet 14 of the battery 12 is connected via a battery cooler 25 to the second coolant inlet 6 of the control module 1 or of the coolant control valve 2. There thus results a third coolant circuit 26, for example, in the flow direction as follows: second coolant inlet 6 of the coolant control valve 2, coolant temperature sensor 3, coolant pump 4, coolant outlet 7 of the control module 1, battery 12, coolant outlet 14 of the battery, battery cooler 25 and back to the second coolant inlet 6. The battery cooler 25 may be equipped with a fan 27.

During operation, the control module 1 can thus be supplied through the first coolant inlet 5 with cool water via the heat exchanger 15. The second coolant inlet 6 of the coolant control valve 2 supplies the control module 1, where appropriate, with warm water. The coolant control valve 2 may be configured as a mixing valve and thus allows optimal temperature control of the battery 12, since the cooling water from both inflows may be mixed. The coolant outlets 13 and 14 of the battery 12 serve for attachment to the heat exchanger 15 or to a radiator.

The operation of the cooling arrangement may occur as follows: at first the battery 12 is cold and is heated, where appropriate, with warm water via the second coolant inlet 6 of the control module 1, the water leaving the battery 12 again at the second coolant outlet 14. With increasing temperature of the battery 12, where appropriate the fan 27 is switched on in addition at a corresponding rotational speed. The battery 12 may be operated, for example, in a temperature range between 20 degrees Celsius and 40 degrees Celsius. If the coolant temperature sensor 3 measures 35 degrees Celsius for example, a corresponding measurement signal can be used to switch over the coolant control valve 2 in order that the battery can now be cooled more effectively via the first coolant circuit 16. For this purpose, the coolant control valve 2 opens the first coolant inlet 5. In a mixing valve operation, the second coolant inlet 6 can be opened at the same time in order to mix the coolants from both coolant circuits 16 and 26 for optimal temperature control of the battery 12. In an extreme case in which the first coolant circuit is also no longer capable of sufficiently cooling the battery 12, a measurement signal of the coolant temperature sensor 3 may be used to successively switch off the battery 12.

In some implementations, a local control unit (smart control hub) is integrated in the control module. The subfunction "temperature control of the battery" may thus be realized in a server-based architecture or in conjunction with an ECU (electronic control unit).

In some examples, a heating element is integrated in the control module. A PTC (positive temperature coefficient) heater is thus for example integrated in the control module in order to heat the battery. This heater may be inserted upstream of the second coolant inlet 6.

In some implementations, the first coolant outlet 13 of the battery 12 is attached to a coolant circuit of the drive train that serves to cool the electric motor and/or the electronics (DC converter or charging device). This would have the advantage that the waste heat of these components can be used to heat the battery. In this case, a dedicated battery cooler would not be present in the system.

The above-described control module for temperature control of a battery has the advantage of small dimensions with high integration density. Especially, the number of connection hoses in relation to a conventional design can be reduced. By virtue of the compact construction, a local control unit can provide the functions of battery temperature regulation without attachment to a central control unit. Furthermore, an additional bypass valve for the cooling circuit can be dispensed with. Moreover, the control module can advantageously be directly mounted onto the battery to be cooled. Where appropriate, a single electrical interface for simpler handling is also provided. Particular advantages of autonomous cooling are afforded if a dedicated control device is integrated in the control module, with the result that autonomous diagnosis may occur and possibly only simple control signals have to be fed from outside.

A number of implementations have been described. Nevertheless, it will be understood that various modifications may be made without departing from the spirit and scope of the disclosure. Accordingly, other implementations are within the scope of the following claims.

LIST OF REFERENCE ELEMENTS

1 Control module
2 Coolant control valve
3 Coolant temperature sensor
4 Coolant pump
5 First coolant inlet
6 Second coolant inlet
7 Coolant outlet
8 Coolant inlet
9 Valve interface
10 Sensor interface
11 Pump interface
12 Battery
13 First coolant outlet
14 Second coolant outlet
15 Heat exchanger
16 First coolant circuit
17 Second coolant circuit
18 Compressor
19 Sensor system
20 Air-conditioning system condenser
21 Expansion valve
22 Air-conditioning system evaporator
23 Expansion valve
24 Passenger compartment
25 Battery cooler
26 Third coolant circuit
27 Fan

What is claimed is:

1. A control module for temperature control of a battery, the control module comprising:
   a coolant control valve having a first coolant inlet, a second coolant inlet, and a coolant outlet, the coolant control valve configured to connect to a first coolant circuit at the first coolant inlet and to a second coolant circuit at the second coolant inlet;
   a coolant temperature sensor; and
   a coolant pump having a pump inlet and a pump outlet, the pump inlet directly connected to the coolant outlet via a coolant path, the pump outlet is flow-connected to a coolant inlet of the battery, the coolant temperature sensor positioned at the pump inlet or at the pump outlet,
   wherein the coolant control valve, the coolant temperature sensor and the coolant pump are assembled as an independent subassembly to form the control module.

2. The control module of claim 1, wherein:
   in a first switching state of the coolant control valve, only the first coolant inlet forms an inlet for coolant to the control module; and
   in a second switching state, only the second coolant inlet forms the inlet for coolant to the control module, or the coolant control valve is configured as a mixing valve.

3. The control module of claim 1, comprising a single common electrical interface for power supply and/or communication.

4. The control module of claim 1, wherein the coolant temperature sensor is integrated in a housing of the coolant control valve or of the coolant pump.

5. The control module of claim 1, wherein a heating element is mounted in or on the coolant control valve or the coolant pump.

6. The control module of claim 1, further comprising a control device autonomously controlling or regulating the control module under open-loop or closed-loop control.

7. A cooling arrangement for a motor vehicle, the cooling arrangement comprising:
a control module for temperature control of a battery, the control module comprising:
a coolant control valve including:
a first coolant inlet for connection to a first coolant circuit,
a second coolant inlet for connection to a second coolant circuit, and
a coolant outlet;
a coolant temperature sensor; and
a coolant pump having a pump inlet and a pump outlet, the coolant outlet directly connected to the pump inlet via a coolant path, wherein the coolant control valve, the coolant temperature sensor and the coolant pump are assembled as an independent subassembly to form the control module, the coolant temperature sensor positioned at the pump inlet or at the pump outlet;
a battery connected on a battery inlet side to the coolant outlet of the coolant pump, the battery having a first battery coolant outlet and a second battery coolant outlet, a part of the first coolant circuit runs from the first battery coolant outlet through a heat exchanger to the first coolant inlet of the coolant control valve;
a second coolant circuit which is separated from the first coolant circuit and in which the heat exchanger is also integrated; and
a third coolant circuit, of which a part runs from the second battery coolant outlet to the second coolant inlet of the coolant control valve, for cooling the battery.

8. The cooling arrangement of claim 7, wherein:
in a first switching state of the coolant control valve, only the first coolant inlet forms an inlet for coolant to the control module, and
in a second switching state, only the second coolant inlet forms the inlet for coolant to the control module, or the coolant control valve is configured as a mixing valve,
wherein the coolant control valve is switched into the second switching state below a predetermined temperature and into the first switching state above the predetermined temperature.

9. The cooling arrangement of claim 7, wherein the first cooling circuit runs through at least one drive component for the motor vehicle.

* * * * *